United States Patent
Mentelos

(10) Patent No.: US 8,035,356 B2
(45) Date of Patent: Oct. 11, 2011

(54) ULTRA-CAPACITOR BASED UNINTERRUPTIBLE POWER SUPPLY

(75) Inventor: Richard Mentelos, Guilford, CT (US)

(73) Assignee: RAM Technologies, LLC, Guilford, CT (US)

( * ) Notice: Subject to any disclaimer, the term of this patent is extended or adjusted under 35 U.S.C. 154(b) by 307 days.

(21) Appl. No.: 12/473,603

(22) Filed: May 28, 2009

(65) Prior Publication Data

US 2009/0289607 A1 Nov. 26, 2009

Related U.S. Application Data

(63) Continuation-in-part of application No. 11/608,858, filed on Dec. 11, 2006, now abandoned.

(60) Provisional application No. 60/750,720, filed on Dec. 15, 2005.

(51) Int. Cl.
 *H02J 7/00* (2006.01)

(52) U.S. Cl. ..................... 320/166
(58) Field of Classification Search ............ None
See application file for complete search history.

(56) References Cited

U.S. PATENT DOCUMENTS

| 5,424,936 | A  | * | 6/1995  | Reddy ............... 363/97 |
| 6,137,280 | A  | * | 10/2000 | Ackermann et al. .......... 323/354 |
| 7,772,720 | B2 | * | 8/2010  | McGee et al. ................. 307/66 |
| 7,802,121 | B1 | * | 9/2010  | Zansky et al. ................. 713/340 |
| 2008/0272656 | A1 | * | 11/2008 | Mason ............... 307/66 |
| 2009/0201703 | A1 | * | 8/2009  | Klikic et al. .................... 363/41 |

* cited by examiner

*Primary Examiner* — Vinh Nguyen
(74) *Attorney, Agent, or Firm* — Bourque and Associates, PA

(57) ABSTRACT

A backup power supply includes at least one ultra capacitor to store energy. The backup power supply includes a multiphase boost converter to provide a relatively constant voltage level from the energy stored on the at least one ultra capacitor. A charging and discharging controller is used to monitor the status of a power supply and control the charging and discharging of the ultra capacitors.

9 Claims, 5 Drawing Sheets

ULTRA-CAPACITOR BASED UNINTERRUPTIBLE POWER SUPPLY

CROSS-REFERENCE TO RELATED APPLICATIONS

This application is a continuation-in-part of U.S. patent application Ser. No. 11/608,858 filed on Dec. 11, 2006 entitled "BACKUP POWER SUPPLY" now abandoned, which in turn claims priority to U.S. Provisional Application No. 60/750,720 filed on Dec. 15, 2005 entitled "BACKUP POWER SUPPLY", both of which are incorporated fully herein by reference.

TECHNICAL FIELD

The present invention relates to uninterruptible or backup power supplies and more particularly, relates to backup power supplies using one or more ultra-capacitors along with a multiphase boost converter that allows the uninterruptible power supply to provide a generally constant voltage level from the one or more ultra capacitors.

BACKGROUND INFORMATION

A backup power supply (also sometimes called an uninterruptible power supply) is a power supply that keeps computer hardware/software, medical devices or other sensitive or important electronics operating in the event of a power outage. Most backup power supplies serve to keep the hardware and software running for a few minutes until the hardware may safely be shut down or until a backup generator or other power source resumes providing power. Backup power supplies typically operate on a chargeable battery that provides power when the main AC power fails, thus making sure that the power to the hardware or electronics is uninterrupted.

In the past, several different types of chargeable chemical batteries have been used in uninterruptible power supplies. For example, Lead Acid chargeable batteries typically last about 2-4 years depending on environmental conditions like temperature, cycle use, and other variables. Recently, Lithium Polymer chargeable batteries have entered the market but they have similar life expectancies. All of the known chemical batteries, however, in addition to short lifespans, suffer from several other drawbacks including susceptibility to changes in temperature and shock, as well as overcharging and discharging inefficiency. Chemical batteries require significant maintenance and are potentially damaging to the environment when disposed of because they contain toxic chemicals. Moreover, traditional chemical batteries operate in a very narrow voltage range. For example, a 12 volt battery typically operates within a 3 volt range from approximately 10.7 volts to approximately 12.7 volts. Once a battery gets below 10.7 volts, any energy stored in the battery is not usable and is lost.

The ultra capacitor is a relatively new device and offers a new way of storing electric energy. Instead of storing energy electrochemically, it stores it in an electric field. Ultra capacitors have multiple advantages over conventional batteries, including a lifetime of over 10 years, resistance to changes in temperature, shock, overcharging, and discharging efficiency. They require less maintenance than conventional batteries and are light on the environment when disposed because they lack toxic chemicals. Their energy, however, is retrieved in the form of a voltage which decreases as the ultra capacitor discharges. Although the stored energy is retrievable, the use of an ultra capacitor in a backup power supply has not been achievable because the coupled electrical devices require a constant voltage level which the ultra capacitor, by itself, cannot provide.

Accordingly, a need exists for an uninterruptible power supply that uses a power source in the form of an ultra capacitor along with an accompanying circuit that together, form a reliable uninterruptible power source for providing backup power in the form of a constant voltage level.

BRIEF DESCRIPTION OF THE DRAWINGS

These and other features and advantages of the present invention will be better understood by reading the following detailed description, taken together with the drawings wherein.

DETAILED DESCRIPTION

Figure 1:
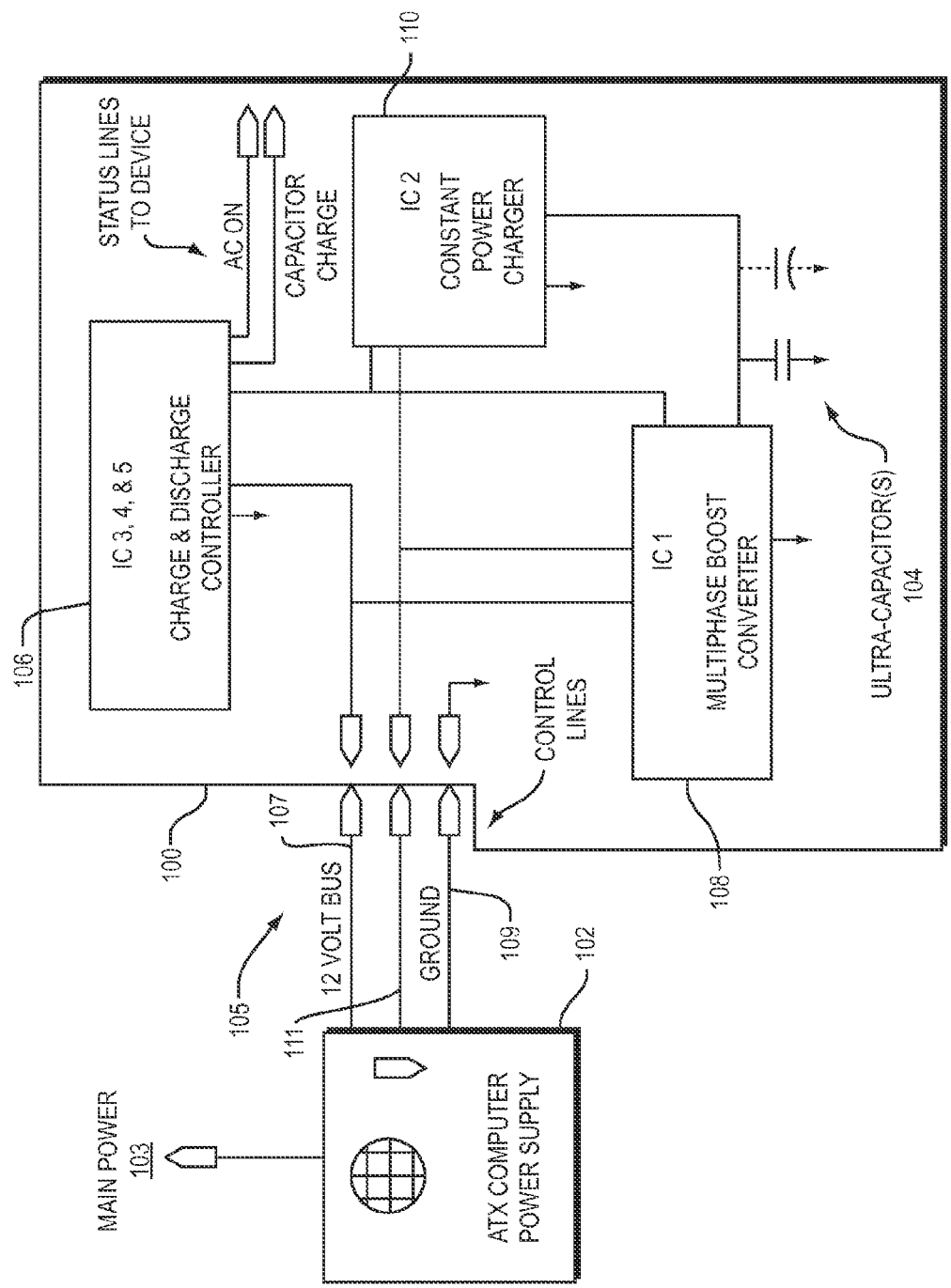
FIG. 1 is a block diagram of a backup power supply according to an exemplary embodiment of the invention.

FIG. 1 is a block diagram of a backup power supply 100 according to a first exemplary embodiment of the invention. The backup power supply provides power to a hardware power supply 102 (not part of the invention) when the main source of power 103 supplied to the hardware power supply 102 fails or is interrupted. The backup power supply 100 uses one or more ultra capacitors 104 to store and supply secondary power when the main power source 103 to the hardware power supply 102 is interrupted. During normal operating conditions when the main power source 103 is supplying power to the hardware power supply 102, the backup power supply 100 receives power from the hardware power supply over bus 105 to charge and maintain the ultra capacitors 104 in a charged state. This may be referred to as a charging cycle and will be discussed in greater detail later herein. When the main source of power 103 supplied to the hardware power supply 102 is interrupted, the backup power supply 100 goes into a discharging cycle and supplies a secondary source of power to the hardware power supply 100 over bus 105 by discharging the one or more ultra capacitors 104. Details regarding the components and charging and discharging processes are discussed in greater detail later herein.

Referring to FIG. 1, the hardware power supply 102 receives AC power from the main power source 103, for example, a standard AC utility outlet. The hardware power supply 102 converts the Alternating Current (AC) power to Direct Current (DC) power that is used to supply power to the intended hardware. The hardware power supply 102 may provide a 12-volt bus 107, a ground 109, and one or more control lines 111 (collectively bus 105) to the backup power supply 100. The control lines 111 provide the status of the main power source supply to both a backup power controller 106 and a multiphase boost converter 108. The 12-volt bus 107 provides power to components of the backup power supply 100 during the charging cycle and receives power from the backup power supply 100 during the discharging cycle.

The one or more ultra capacitors 104 are super capacitors or ultra capacitors. The ultra capacitors may use two sheets of aluminum foil and a separator, as is well known in the art. The electric charge is stored on the aluminum foil surface. The ultra capacitors use a structure of aluminum foil (current collector) coated with carbon powder (electric charge storage). With a surface area of up to about 2000 square meters per gram of carbon, significant charge storage is possible. Externally, cylindrical ultra capacitors may use the same form or size structure as chemical electrolytic capacitors. Exemplary ultra capacitors include "BCAP" series ultra capacitors manufactured by Maxwell Technologies of San Diego, Calif. Another example of an exemplary ultra capacitor includes electronic double layer capacitors manufactured by United Chemi-Con (UCC) of Rosemont, Ill. The above are examples of ultra capacitors. It will be apparent to an individual skilled in the art that a variety of ultra capacitors from various manufactures may be used to implement the invention.

The backup power controller 106 regulates the charging and discharging cycles of the one or more capacitors 104. The backup power controller 106 monitors the status of both the AC power source and the charge and discharge status of the one or more ultra capacitors 104. Based on this status information received by the backup power controller 106, the controller 106 regulates the charging and discharging of the capacitors 104.

If the main power source 103 is currently supplying power to the hardware power supply 102, the controller 106 signals to a power charger 110 to continue to supply power from the 12-volt bus 107 to the ultra capacitors 104, thus charging and/or maintaining the ultra capacitors 104 in a charged state. Because the ultra capacitors 104 have extremely low internal impedance, which is independent of their charged state, the alter capacitors 104 will accept as much current as the power supply provides. In addition, the ultra capacitors 104 are sensitive to voltages greater than their ratings. The power charger 110 may need to limit the voltage in a precise manner. The power charger 110 may need to be designed to a variety of conditions required by the various ultra capacitors selected.

If the main power source 103 is interrupted, the controller 106 signals the multiphase boost converter 108 to start draining power from the capacitors 104 and supply power to the hardware power supply 102 via the 12-volt bus 107. The multiphase boost converter 108 needs to supply a relatively constant voltage to be connected electronic equipment using the power stored in the ultra capacitors 104 that supply power over a range of voltages. In the preferred embodiment, the multiphase boost converter 108 is an efficient two-phase boost converter as discussed in the exemplary embodiment discussed later herein. The multiphase boost converter 108 may alternatively be a single phase or use additional phases to provide additional efficiency, for example, a four-phase boost converter may be used. Depending on the ultra capacitors 104 used and the desired efficiency, the boost converter 108 may use a variety of designs and configurations as are apparent to an individual skilled in the art.

An ultra capacitor 104 stores energy over an entire range of voltages; thus the energy needs to be extracted by discharging the ultra capacitor 104 to the lowest possible voltage. A characteristic of the boost converter 108 is that the output voltage may be greater than the input voltage. Although a "buck" type converter may be utilized, such a converter will only discharge the capacitor to the desired output voltage, which may leave unused energy in the capacitor. Due to the design of a "buck" converter, the output may have to be less than the input. However a "buck-boost" type converter will allow the output voltage to be above and below the input voltage from the ultra capacitor. The "buck-boost" type converter will generally allow a greater voltage range from the capacitor. The "buck-boost" or a polyphase "buck-boost" converter may be limited by the design of the "buck-boost" converter.

The backup power controller 106 also monitors the output voltage of the multiphase boost converter 108. When the voltage output of the multiphase boost converter 108 drops below a predetermined threshold, the controller 106 may shut down the backup power supply 100 in order to avoid damage to the backup power supply 100 and/or the hardware that is being supplied with power. The controller 106 will then remain in a tripped state until reset. The reset may occur when the controller 106 receives a signal that the power supplied to the main power supply has been reestablished. Once the controller 106 is reset, the cycle of charging and discharging is continued.

In addition to controlling the components of the backup power supply 100, the controller 106 may also signal the hardware directly or via the hardware power supply the status of the backup power supply 100. The backup power supply 100 according to the exemplary embodiment of the block diagram in FIG. 1 illustrates the backup power supply 100 as being separate from the hardware power supply 102, however, another exemplary embodiment of the invention contemplates implementation of the backup power supply 100 and the hardware power supply as a single unit. Although the various components are grouped together for illustrative purposes according to the block diagram of FIG. 1, the invention is not limited to the configuration of the illustrative block diagram. Components may be added, substituted or relocated to perform various tasks of the invention as described herein.

Figure 2A:
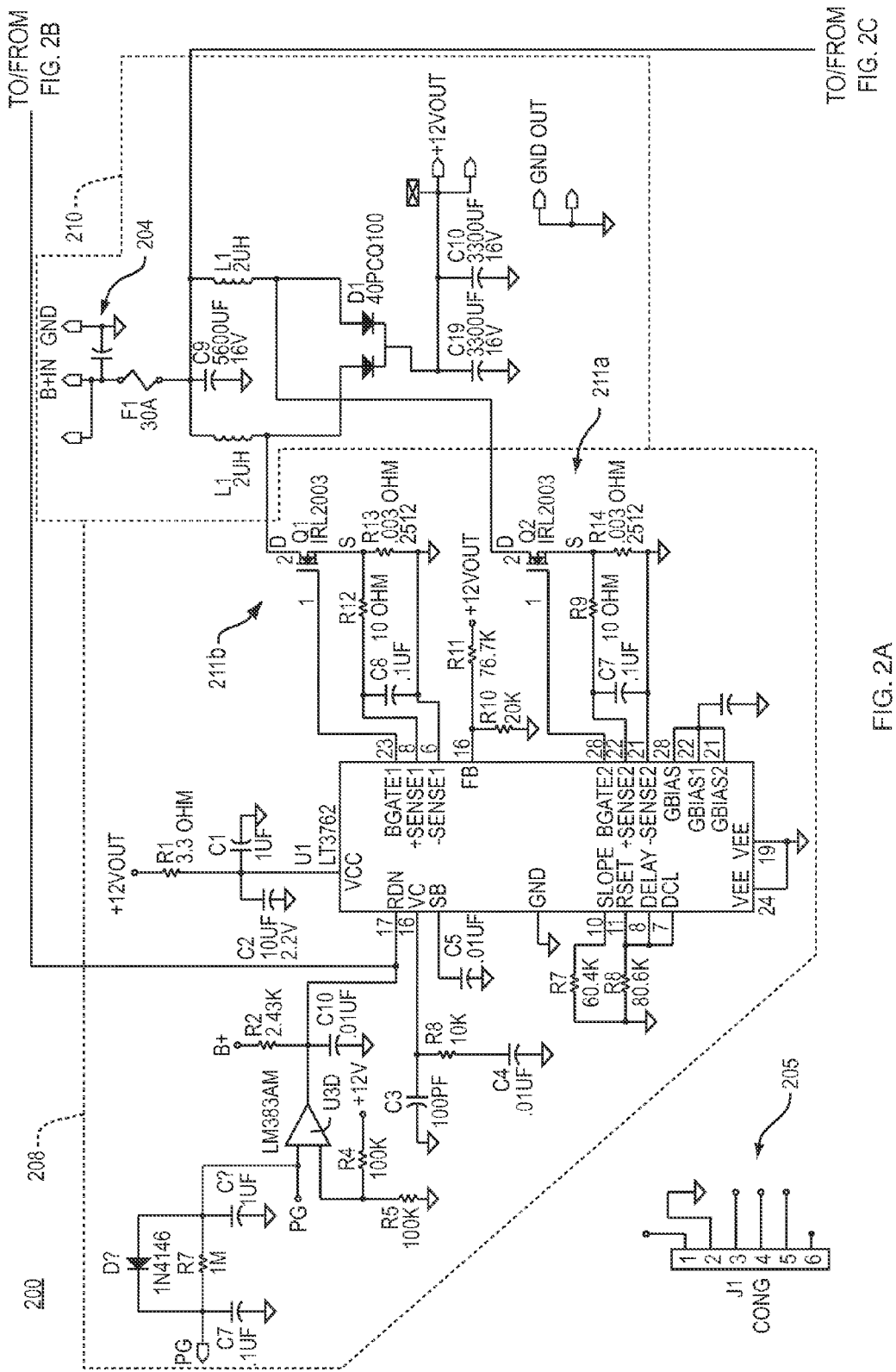
FIG. 2 is a schematic of a circuit implementing the backup power supply according to the exemplary embodiment of the invention.
Figure 2B:
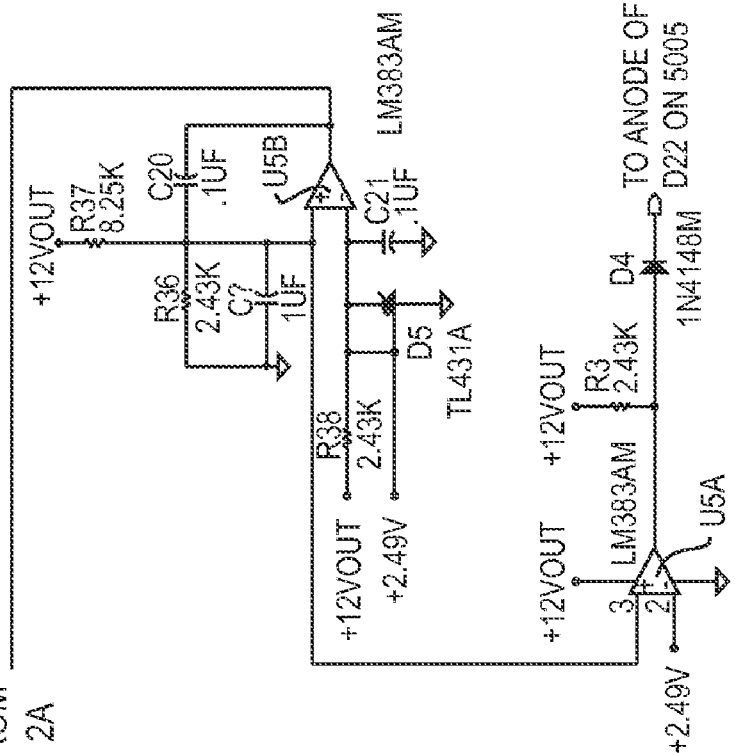
Figure 2C:
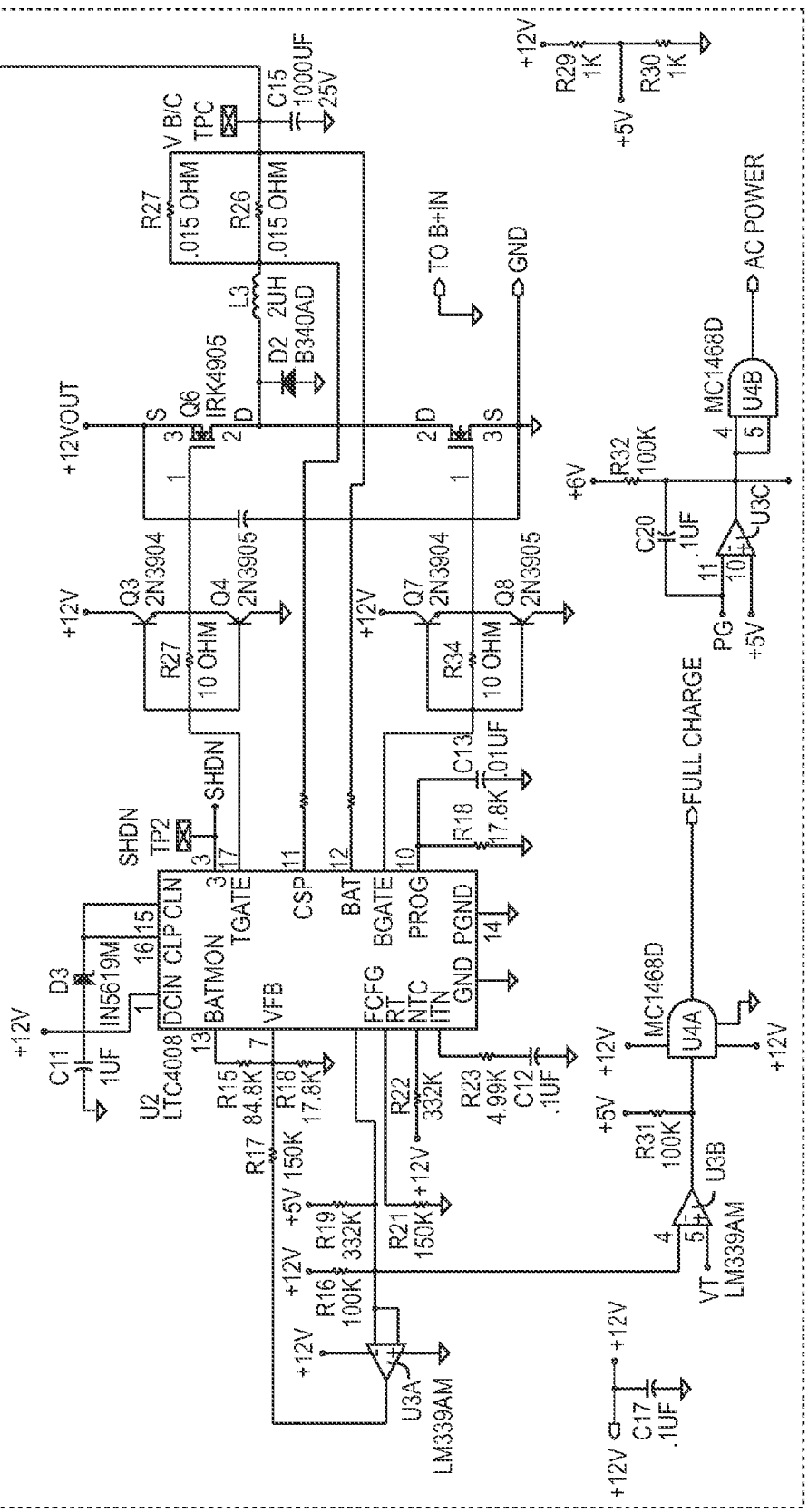

Referring to FIG. 2, a detailed circuit diagram of a backup power supply 200 is used to implement the exemplary embodiment of the invention. It will be apparent to individuals skilled in the art that other circuit configurations may be used to implement features of the invention. The backup power supply circuit 200 provides backup power to a hardware power supply (not shown). The hardware power supply may be an ATX computer power supply or other form factor of the FX series power supplies or other hardware specific power supply. The hardware power supply is not limited to any specific form factor. The backup power supply circuit uses one or more ultra capacitors 204 to store and supply secondary power when the main power source of the hardware power supply is interrupted. The backup supply circuit may use four (4), 2.5 volt, 400 farad ultra capacitors in series to supply a total of 10 volts. During normal operating conditions when the main power source is supplying power to the hardware power supply, the backup power supply 200 receives power from the hardware power supply to charge and maintain the ultra capacitors 204 in a charged state. This may be referred to as a charging cycle and will be discussed in greater detail later herein. When the main source of power supplied to the hardware power supply is interrupted, the backup power supply 200 goes into a discharging cycle and supplies a secondary source of power to the hardware power supply by discharging the capacitors. Details regarding the components and charging and discharging processes are discussed in greater detail later herein.

The hardware power supply provides a 12-volt bus, a ground, and one or more control lines (collectively bus 205) to the backup power supply 200. The control lines provide the status of the main power source supply to both the backup power controller 206 and the multiphase boost converter 208. The 12-volt bus provides power to components of the backup power supply 200 during the charging cycle and receives power from the backup power supply 200 during the discharging cycle.

The backup power controller 206 regulates the charging and discharging cycles of the ultra capacitors 204. The backup power controller 206 monitors the status of both the AC power source with an AC power monitoring circuit and the status of the one or more capacitors with a charge monitoring circuit. Based on this status information received by the backup power controller 206, the controller 206 regulates the charging and discharging of the capacitors.

If the main power source is currently supplying power to the hardware power supply, the controller 206 signals to a power charger circuit 210 to continue to supply power from the 12-volt input terminal to the ultra capacitors 204, thus charging and/or maintaining the ultra capacitors 204 in a charged state. The power charger circuit 210 regulates the current supplied to the ultra capacitors 204 during the charging process.

If and when the main power source is interrupted, the controller 206 signals the multiphase boost converter 208 to start draining power from the ultra capacitors 204 and supply power to the hardware power supply via the 12-volt terminal 205. The multiphase boost converter 208 will supply a relatively constant voltage using the power stored in the ultra capacitors 204 that supply power over a wide range of voltages. The multiphase boost converter 208 is preferably a two-phase boost converter 208 with a first phase 211a and a second phase 211b operating 180 degrees out of phase from the first phase 211a (although more phases are contemplated and within the scope of the invention). Thus, when Q1 is on, Q2 is off, and when L1 is charging, L2 is discharging. Multiphase boost converter is able to extract all or nearly all of the energy from the ultra capacitors 204 by adjusting the time or duty cycle in which each phase is left on to allow the ultra capacitor 204 to discharge. Thus, as the voltage on the capacitor goes down, each phase 211 is left on for a longer period of time. Thus, the product of the present voltage on the ultra capacitor times time is a constant (for example, 12 volts), thus boosting whatever voltage is on the capacitor to the appropriate, desired voltage (e.g. 12 volts). This assures a constant voltage is provided to the hardware or electronics coupled to the uninterruptible power supply 200.

The backup power controller 206 also monitors the output voltage of the multiphase boost converter 208 with a shutoff circuit. When the voltage output of the multiphase boost converter 208 drops below a predetermined threshold, the controller 206 will shut down the backup power supply in order to avoid damage to the backup power supply and/or hardware that is being supplied with power. The controller 206 will remain in a tripped state until reset. The reset may occur when the controller 206 receives a signal that the power supplied to the main power supply has been reestablished. Once the controller 206 is reset the cycle of charging and discharging is continued. The invention is not limited to the configuration of the circuit components shown in the exemplary embodiment shown in FIG. 2. A variety of alternative and equivalent configurations (in hardware and/or firmware) for the exemplary circuit shown in FIG. 2 may be added or substituted.

Figure 3:
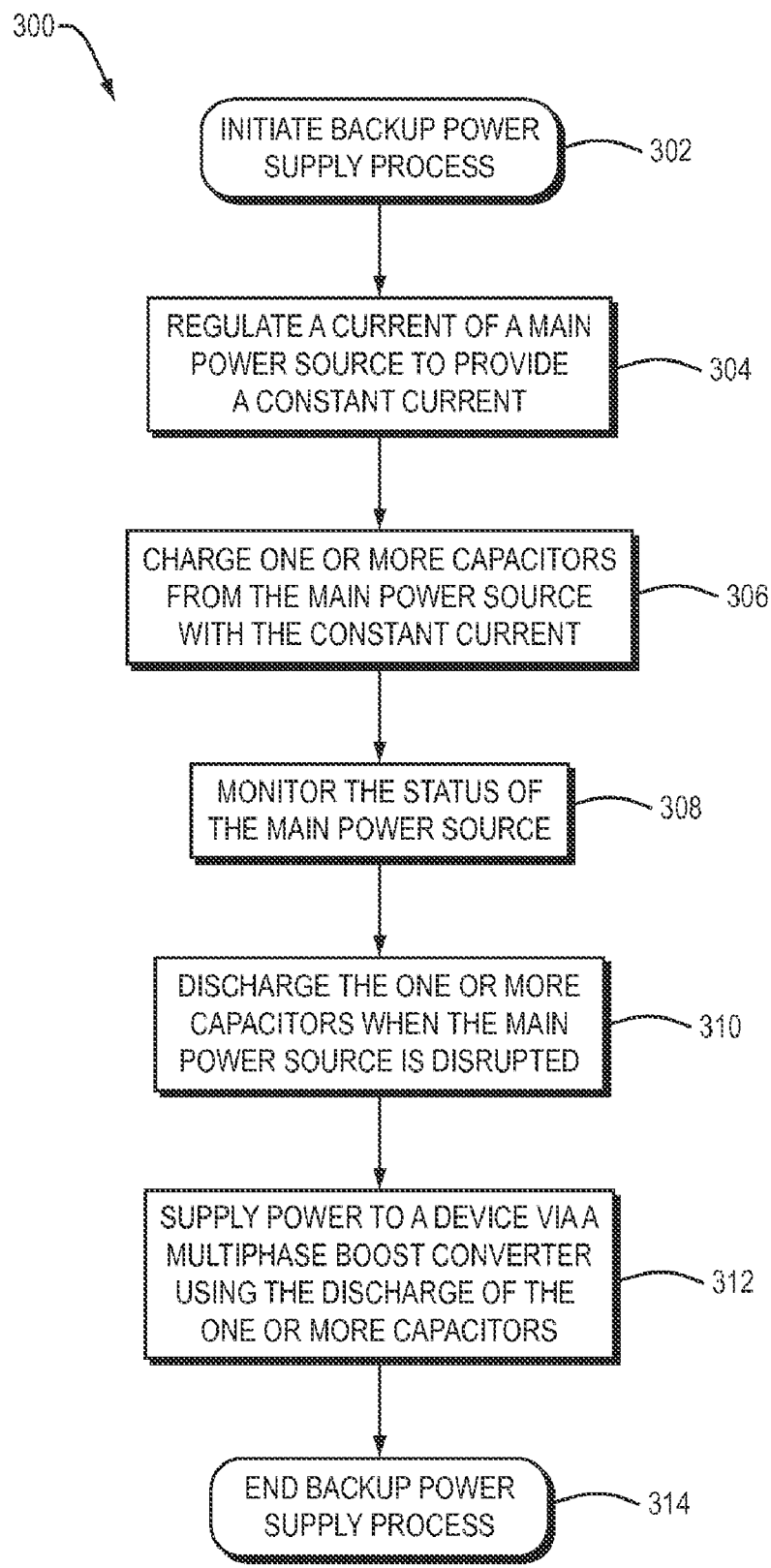
FIG. 3 is a flowchart of an exemplary backup power supply method according to the present invention.

Referring to FIG. 3, an exemplary backup power supply method 300 supplies temporary power to a device. The device may be, for example, a power supply, a desktop computer, a server or other processor and memory that may require a temporary source of power, a medical device or other electronic device. The backup power supply method is initiated when the device is activated (act 302). The method is not limited to being initiated by activation of the device; for example, the backup power supply may be initiated anytime a source of power is supplied to the backup power supply. The current in the backup power supply is regulated to provide a constant current source from main power source, which is typically AC power (act 304). The current is supplied to one or more ultra capacitors and is used to charge the capacitors to a charged state (act 306).

A controller monitors the status of the main power source (act 308). The monitoring may be accomplished by a controller within the backup power supply or by a remote device that may signal the backup power supply of an actual or impending disruption of the main power. The disruption may be a drop in power or a spike that may require the main power supply to be interrupted. Once a disruption has been detected, the backup power supply switches from a charging state to a discharging state. The one or more capacitors are discharged of their stored power (act 310). A multiphase boost converter uses the variable and slowly dropping voltage level supplied by the discharging ultra capacitors and boosts the dropping voltage to provide power with constant voltage that may be used by the device to which the backup power supply is connected (act 312). The device may use the backup power to perform critical functions, for example, but not limited to, shutting down operations or switching to another power source. The controller may also monitor the discharging voltage of the capacitors to prevent damage resulting from too low a voltage level. Once the voltage drops below a predetermined level, the backup power supply will be completely shutoff to prevent damage to the backup power supply and/or the device being supplied power. The process controller will then wait for the main power supply to re-supply the backup power supply with power or for a reset by an administrator. Aspects of the exemplary backup power supply process may be performed by a dedicated controller within the backup power supply or by an ancillary processor that may be a part of the device being supplied power.

Modifications and substitutions by one of ordinary skill in the art are considered to be within the scope of the present invention, which is not to be limited except by the allowed claims and their legal equivalents.

The invention claimed is:

1. A backup power supply, for providing energy to a coupled electrical device, said backup power supply comprising:
    one or more ultra capacitors, electrically coupled to a source of energy, and configured for storing said energy;
    a charging and discharging controller, coupled to said source of energy and to said one or more ultra capacitors, for monitoring a status of said source of energy and for regulating the charging and discharging of the one or more ultra capacitors; and
    a multiphase boost converter, electrically coupled to said one or more ultra capacitors and including at least one variable energy recovery time factor circuit, each said at least one variable energy recovery time factor circuit including one or more controllable electrical devices operable in one of an on condition and an off condition, wherein said on or off condition of said one or more controllable electrical devices establish a variable energy recovery time period for said at least one variable energy recovery time factor circuit, said multiphase boost converter responsive to an amount of energy presently stored by said one or more ultra capacitors in the form of a voltage level, for increasing said variable energy recovery time period as said voltage level of said energy stored by said one or more ultra capacitors decreases, for providing a relatively constant voltage from the stored energy of the one or more ultra capacitors.

2. The backup power supply of claim 1, further including a charging regulator, for regulating an energy current that is used to charge the one or more ultra capacitors.

3. The backup power supply of claim 1, wherein the multiphase boost converter is a buck boost converter.

4. The backup power supply of claim 1, wherein the backup power supply is configured for an ATX computer power supply.

5. The backup power supply of claim 1, wherein the one or more ultra capacitors are charging during normal operation of a coupled electrical device being supplied power.

6. The backup power supply of claim 1, wherein the charging and discharging controller signals the coupled electrical device being supplied power when the charging and discharging controller detects a switch between charging and discharging modes.

7. The backup power supply of claim 1, wherein the charging and discharging controller shuts off the voltage supplied by the one or more ultra capacitors when the voltage supplied by the one or more ultra capacitors drops below a predetermine voltage.

8. The backup power supply of claim 1, wherein said multiphase boost converter includes a two phase boost converter, and wherein whenever a first of said two phase boost converters is operative, the second of said two phase boost converters is inoperative.

9. A backup power supply, for providing energy to a coupled electrical device, said backup power supply comprising:

one or more ultra capacitors, electrically coupled to a source of energy, and configured for storing said energy;

a charging and discharging controller, coupled to said source of energy and to said one or more ultra capacitors, for monitoring a status of said source of energy and for regulating the charging and discharging of the one or more ultra capacitors; and a two-phase buck type boost converter, electrically coupled to said one or more ultra capacitors and including at least one variable energy recovery time factor circuit each, said at least one variable energy recovery time factor circuit including one or more controllable electrical devices operable in one of an on condition and an off condition, wherein said on or off condition of said one or more controllable electrical devices establish a variable energy recovery time period for said at least one variable energy recovery time factor circuit, said two-phase buck type boost converter responsive to an amount of energy presently stored by said one or more ultra capacitors in the form of a voltage level, for increasing said variable energy recovery time period as said voltage level of said energy stored by said one or more ultra capacitors decreases, thereby boosting said voltage level of said energy stored by said one or more ultra capacitors, for providing a relatively constant voltage from the stored energy of the one or more ultra capacitors, and wherein whenever a first of said two phase buck type boost converters is operative, the second of said two phase buck type boost converters is inoperative.

* * * * *